US008871050B2

(12) United States Patent
Blot et al.

(10) Patent No.: US 8,871,050 B2
(45) Date of Patent: Oct. 28, 2014

(54) AUTOMATED DRAPE-FORMING DEVICE

(75) Inventors: Philippe Blot, Nantes (FR); Dominique Guittard, Toulouse (FR); Jeannick Dubillot, Le Pallet (FR); Stephane Chene, Chemille (FR); Cedric Gauthier, Gorges (FR); Jean-Louis Fournier, Carquefou (FR)

(73) Assignee: Airbus Operations S.A.S., Toulouse (FR)

( * ) Notice: Subject to any disclaimer, the term of this patent is extended or adjusted under 35 U.S.C. 154(b) by 319 days.

(21) Appl. No.: 13/497,136

(22) PCT Filed: Sep. 20, 2010

(86) PCT No.: PCT/FR2010/051947
§ 371 (c)(1),
(2), (4) Date: Jul. 3, 2012

(87) PCT Pub. No.: WO2011/033240
PCT Pub. Date: Mar. 24, 2011

(65) Prior Publication Data
US 2012/0261069 A1    Oct. 18, 2012

(30) Foreign Application Priority Data
Sep. 21, 2009  (FR) .................................. 09 56481

(51) Int. Cl.
*B32B 37/00* (2006.01)
*B29C 65/00* (2006.01)
*B29B 11/16* (2006.01)
*B29C 70/38* (2006.01)

(52) U.S. Cl.
CPC .............. *B29C 70/386* (2013.01); *B29B 11/16* (2013.01)
USPC ........ 156/322; 156/181; 156/308.2; 156/324; 156/486; 156/582

(58) Field of Classification Search
USPC .............. 156/166, 180, 181, 199, 250, 308.2, 156/309.9, 322, 324, 468, 486, 497, 499, 156/574, 577, 581, 582, 583.1
See application file for complete search history.

(56) References Cited

U.S. PATENT DOCUMENTS

| 4,541,886 A | 9/1985 | Marlow et al. |
| 4,569,716 A | 2/1986 | Pugh |

(Continued)

FOREIGN PATENT DOCUMENTS

| DE | 10 2006 060361 | 6/2008 |
| EP | 0 846 551 | 6/1998 |

OTHER PUBLICATIONS

International Search Report issued on Feb. 1, 2011 in PCT/FR10/51947 filed on Sep. 20, 2010.

(Continued)

*Primary Examiner* — John Goff
(74) *Attorney, Agent, or Firm* — Oblon, Spivak, McClelland, Maier & Neustadt, L.L.P.

(57) ABSTRACT

The invention relates to an automated device for implementing a drape-forming step to form a laminated fibrous preform, which is then impregnated with resin to produce a part made of composite material. The invention relates more particularly to the production of preforms for manufacturing parts such as panels, in particular very thick panels, that extend basically in two dimensions. The device of the invention comprises a manipulator able to move and orient in space a tape laying head, said tape laying head comprising: a drum comprising a suction orifice leading to its surface and able to individually grasp a length of fabric on a mounting outside the tool and the tape laying head; means designed to subsequently place this length of fabric on the preform comprising means of compacting; and means of heating the length of fabric.

9 Claims, 5 Drawing Sheets

(56) References Cited

U.S. PATENT DOCUMENTS

| | | |
|---|---|---|
| 5,228,944 A | 7/1993 | Seifried et al. |
| 5,431,749 A * | 7/1995 | Messner ................ 156/358 |
| 6,343,639 B1 * | 2/2002 | Kaye et al. .................. 156/539 |
| 6,451,152 B1 | 9/2002 | Holmes et al. |
| 2007/0187026 A1 | 8/2007 | Burgess et al. |
| 2008/0085335 A1 | 4/2008 | Soccard |

OTHER PUBLICATIONS

U.S. Appl. No. 13/499,414, filed Mar. 30, 2012, Blot, et al.

* cited by examiner

AUTOMATED DRAPE-FORMING DEVICE

The invention relates to an automated device for implementing a drape-forming step to form a laminated fibrous preform, which is then impregnated with resin to produce a part made of composite material. Such a preform is called dry because it is essentially formed of fibers and contains only a very small amount of resin, generally less than 5% by mass, intended in particular to give said preform the necessary cohesion to enable its manipulation during subsequent stages of manufacturing the part.

The invention relates more particularly to the production of preforms for manufacturing parts such as panels, in particular very thick panels, that extend basically in two dimensions. Such pieces are used, for example, in aeronautics, as wing panels or for producing the central wing box of an aircraft.

These panels, flat or curved with a large radius of curvature, are laminated on tools that reproduce the shape of said panel. Bands of fibrous material are deposited on this tool so as to form layers. Said bands are dusted with a small quantity of resin. The adhesion of the layers to each other is obtained by thermally activating this dusted resin and compacting the stacking. Brought to a so-called activation temperature, the resin becomes fluid and glues the layers to each other The advantage of this method of manufacturing parts, separating drape-forming and impregnation, is the possibility of integrating sub-assemblies into a single part.

Another advantage is the possibility of realizing a complex lamination involving several materials. For example, for forming a single part, it is possible to deposit non-woven layers and fabrics, even to vary the nature of the fibers deposed according to their position in the stack.

As the bands of material deposited are not tacky, special attention must be paid to the alignment of the lengths of fabric successively deposited on the preform and also to the absence of fiber wrinkling in the deposited lengths of fabric. Misalignments are generated by the deposited length of fabric slipping perpendicular to the deposition direction. This can result in variations in the reinforcing strands or superimpositions that will generate defects in the part after injection and polymerization. Fiber wrinkling is linked to poor control of the deposition speed or to the length of fabric slipping parallel to the deposition direction. Such fiber wrinkling causes a drop in the mechanical characteristics of the final part.

That is why, according to the prior state of the art, these drape-forming operations are mainly performed manually and do not allow very high deposition rates to be achieved.

The invention aims to automate such a method in order to increase the deposition rate while retaining the versatility of the manual method.

To this end, the invention proposes a device for laying up a so-called dry laminated fibrous preform on a forming tool, comprising a manipulator able to move and orient in space a tape laying head, said tape laying head comprising:
  a drum comprising at least one suction orifice leading to its surface and able to individually grasp a length of fabric on a mounting outside the tool and the tape laying head;
  means of heating the length of fabric;
  and also comprising means able to compact the length of fabric on the preform and tension it before its compaction comprising:
    motorization means able to drive the drum at a controlled speed of rotation around its axis;
    a roller separate from the drum and means to pre-adjust its shape, able to compact the length of fabric deposited on the preform.

The manipulator can be a gantry type or in the form of an anthropomorphic robot but must permit a movement of the tape laying head adapted to the deposition direction of the lengths of fabric and the orientation of this tape laying head such that the axis of the drum is substantially parallel to the tangent on the surface laid up during deposition of the fabric length.

These means make it possible to deposit individual lengths of fabric on the preform and, if necessary, vary the nature of the material deposited from one length of fabric to the next. As these materials are not impregnated, and thus not tacky, the suction device on the drum surface means that the lengths of fabric can be held and then released by creating and then breaking a vacuum between the length of fabric and the drum surface. These suction means work together with the motorization of the drum and the separate roller to obtain a controlled tension of the length of fabric during its deposition and thus avoid fiber wrinkling in the length of fabric before it is compacted. The means for pressing and heating the length of fabric makes it possible to thermally activate the dusted resin and thus obtain the length of fabric's adhesion on the preform. The means of pre-adapting the roller's shape allows the length of fabric's pressure profile on the preform to be optimized with the aim of further improving the above effects.

The invention can be implemented according to the advantageous embodiments described below, which may be considered individually or in any technically effective combination.

Advantageously, the means for adapting the shape of the roller comprise:
  two pins able to guide it in rotation at each of its ends;
  a coil spring linked to the pins and extending between said ends, said spring being substantially parallel to the roller's axis of rotation;
  a device able to move the roller's end pins so as to confer a curvature to the coil spring.

This simple mechanism means the presser roller's shape can be modified by bending the coil spring and thus the pressure profile applied on the length of fabric during compaction can be modified.

The pressing means works with the means for heating the length of fabric to bind the latter to the preform. To this end the tape laying head advantageously comprises a nozzle for blowing hot air, the jet of which is directed between the drum and the preform, and a deflector able to isolate the drum from this jet of hot air. In this way the lengths of fabric are heated locally just before being pressed onto the preform. The deflector prevents this heating from gluing the portion of the length of fabric not yet deposited on the surface of the drum.

Advantageously the device that is the subject of the invention comprises means for measuring the orientation of the drum's axis relative to the preform, said means being secured to the axis of the drum. These measurement means make it possible to check the drum's actual orientation relative to the preform or the tool and, if necessary, to correct this orientation by controlling the manipulator's axes if it is different from the programmed orientation. This configuration enables the most uniform contact possible on the preform or the tool, over the entire width of the material to be deposited. A lack of uniformity in this contact leads to a poor connection between the material being deposited and the preform, source of a defect such as a resin pocket between the plies, or even fiber wrinkling in the final part.

The device that is the subject of the invention advantageously comprises means secured to the drum's axis able to detect the position of the edge of an adjacent length of fabric deposited prior to the length of fabric currently being deposited. Knowledge of the position of the already deposited length of fabric in the machine's reference space allows the trajectory followed by the tape laying head to be corrected during deposition so as to maintain the distance between the edges of two lengths of fabric in a range authorized by the part's final application. Advantageously this trajectory correction is carried out at the tape laying head by acting directly on the relative position of the drum. For this purpose the tape laying head comprises motorized means for the relative movement of the drum parallel to its axis. This autonomous system for correcting the deposition trajectory at the head avoids having a very rigid carrier (gantry or robot) and consequently makes it possible to envisage large dimension drape-forming installations with acceptable cross-sections.

According to a particularly advantageous embodiment, the device that is the subject of the invention comprises a cutting table and means able to cut the length and shape of the lengths of fabric. It also preferably comprises a magazine for materials in the form of spools that can be unreeled, on which continuous bands of material are wound.

This configuration of the device makes it possible to implement an automated drape-forming method comprising steps consisting of:

a°) unreeling a length of material from a spool onto the cutting table, b°) separating the unreeled length from the spool by cutting to form a first length of fabric, c°) taking said length of fabric on the cutting table via the drum and winding it on said drum, d°) depositing said length of fabric on the preform by unwinding it from the drum and pressing it on said preform, e°) unreeling and cutting another length of material forming a second length of fabric on the cutting table while the first length of fabric is being deposited, f°) repeating from step c°) with the second length of fabric.

Such a method makes it possible to automatically lay up panels comprising complex stacking using several materials with high productivity, in particular thanks to preparing lengths of fabric in hidden time.

The invention also concerns an advantageous method of drape forming implementing the means described above and comprising a step of pressing the length of fabric on the preform with the help of the roller, the drum being moved by the manipulator at a feed speed, and the length of fabric being unwound from the drum driven at a rotation speed synchronized with the feed speed so as to keep the length of fabric at a substantially constant tension between its output from the drum and its pressing by the roller. This method makes it possible to control the tension of the length of fabric at the time it is deposited and to apply just the tension necessary to it in order to avoid fiber wrinkling without causing changes to the distance between the fibers.

Advantageously, the length of fabric is pressed onto the drum by suction during its unreeling so as to control its unwinding speed and its tension.

Also, advantageously, the shape of the roller is adapted to obtain a defined pressure profile for the length of fabric on the preform.

According to a particular mode of implementation, the shape given to the roller does not complement the shape of the preform on which the length of fabric is deposited. This mode of implementation allows, for example, only part of the width of the length of fabric to be glued.

The invention will now be described more precisely in the context of preferred non-limiting embodiments shown in FIGS. 1 to 13 in which.

Figure 8A:
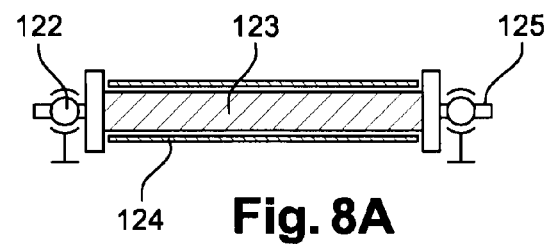
Figure 8B:
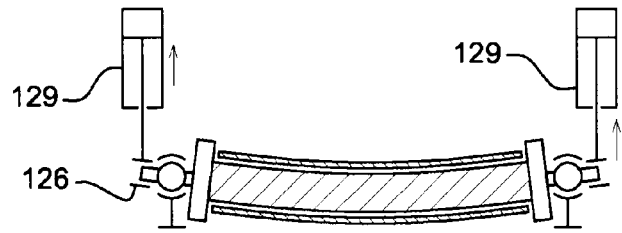
Figure 9:
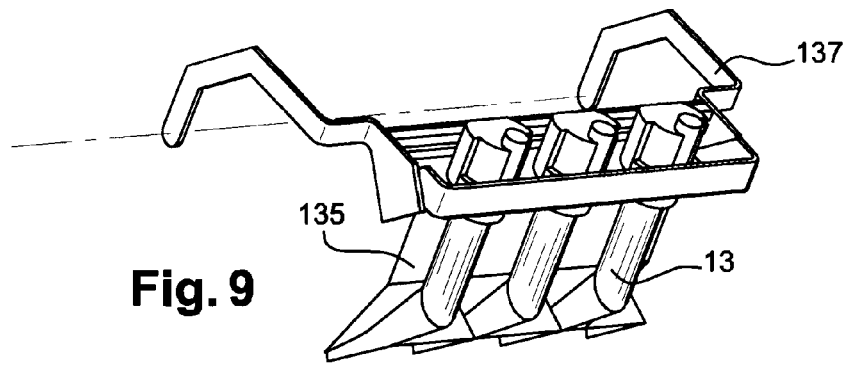
Figure 10:
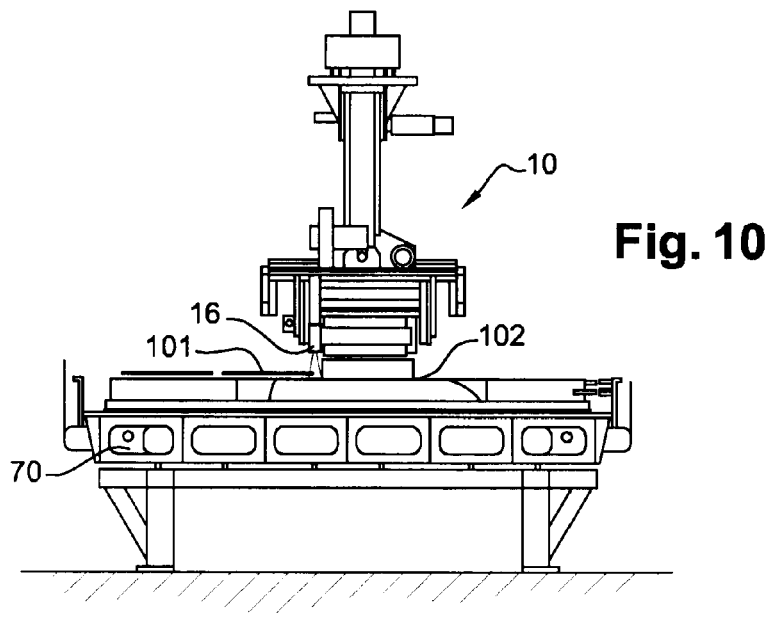
Figure 11:
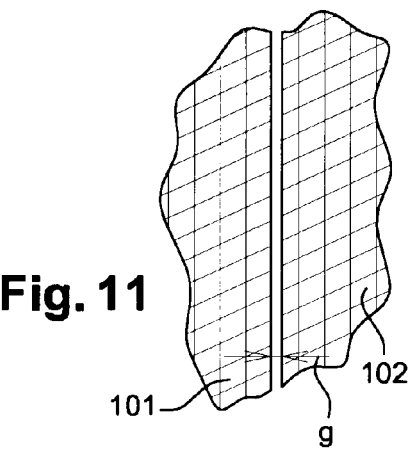
Figure 12:
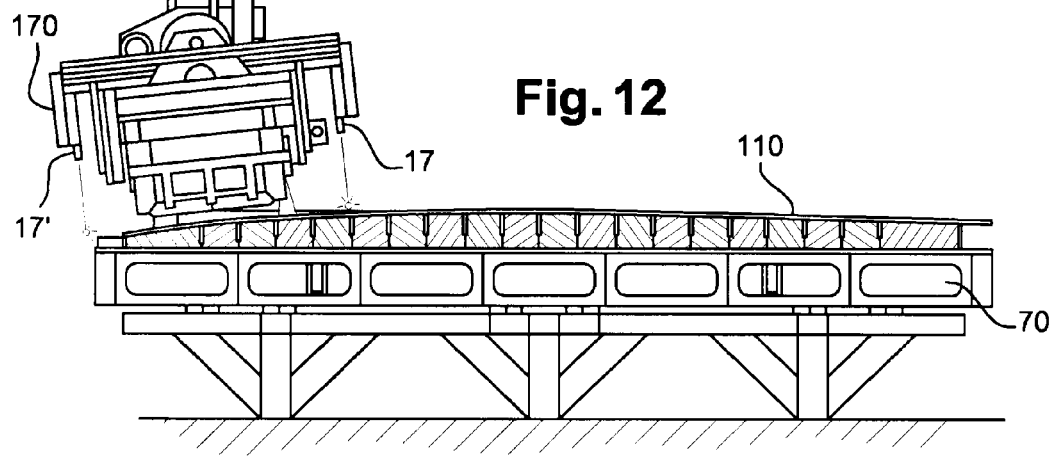
Figure 13:
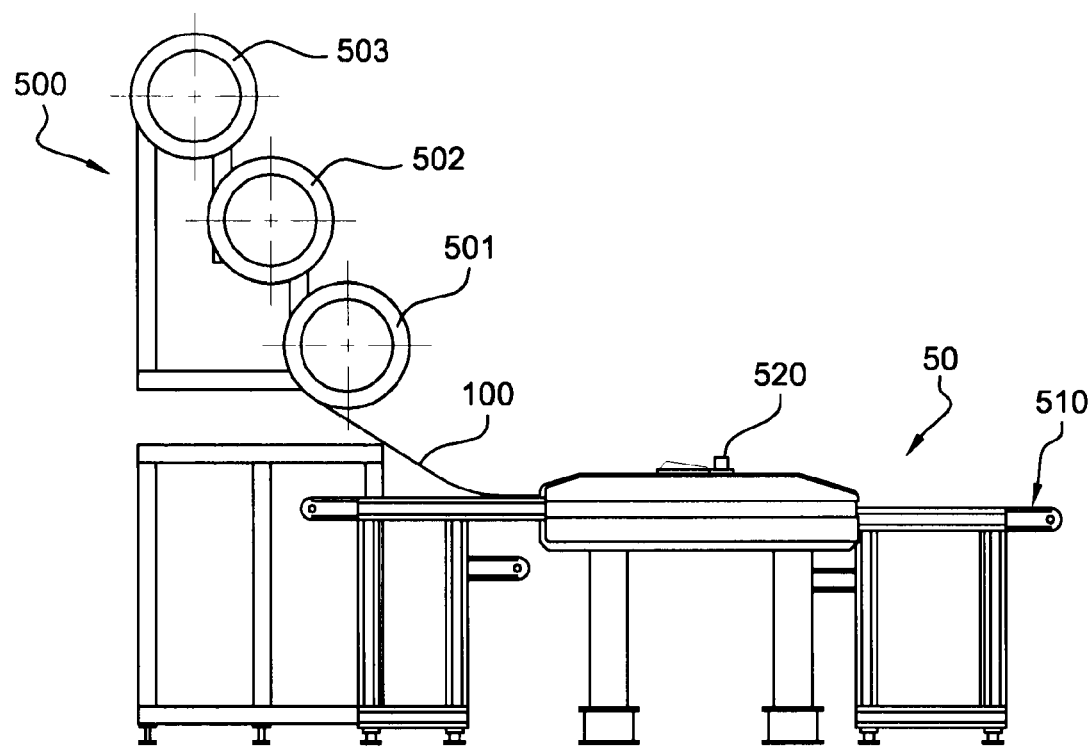

FIGS. 8A, and 8B show schematically from the front some controllable deformation configurations of the roller;

FIG. 9 is a perspective view from behind of a device for heating by blowing hot air adapted to the tape laying head according to the invention;

FIG. 10 illustrates, in an overview from the front, a drape-forming operation utilizing a device representing an embodiment of the drape-forming device according to the invention;

FIG. 11, is a detailed elevation view of 2 lengths of fabric deposited successively by the device that is the subject of the invention;

FIG. 12 is a front overview of a drape-forming operation according to an embodiment of the device according to the invention for the drape-forming of a curved surface;

FIG. 13 is a profile view of the cutting table and its magazines for materials according to an embodiment of the device of the invention.

Figure 1:
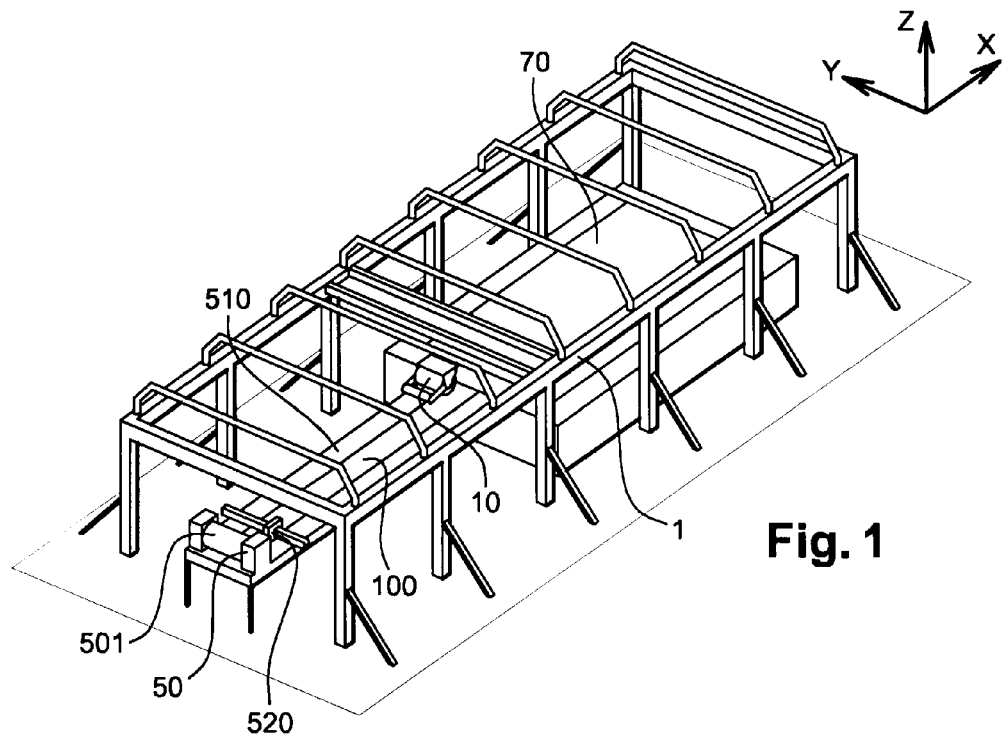
FIG. 1 shows an overview from above and in perspective of an embodiment the drape-forming device of the invention using a gantry type of Cartesian manipulator.
Figure 2:
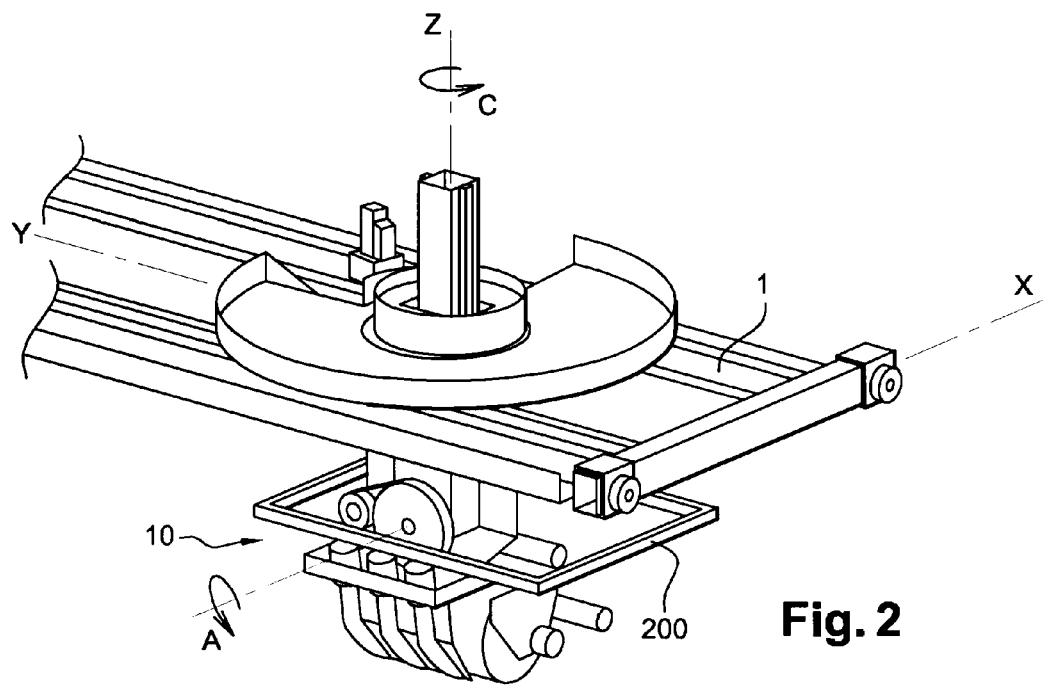
FIG. 2 shows a detail in perspective and seen from above of the tape laying head according to the embodiment of FIG. 1.

FIG. 1: according to an example of realization, the device that is the subject of the invention comprises:
- a manipulator, here in the form of a robot gantry (1)
- a tape laying head (10) able to be moved and oriented in space by the manipulator
- a cutting table (50) for preparing lengths of fabric (100)
- a deposition tool (70) placed in the manipulator's workspace FIG. 2: the tape laying head (10) is mobile with respect to the manipulator (1) according to an axis of translation (Z) and two orthogonal axes of rotation (A, C), all motorized and controlled by a digital control.

Figure 3:
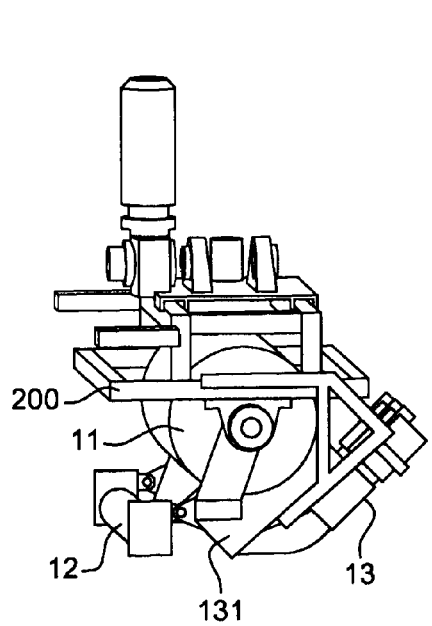
FIG. 3 is a side view in perspective of an embodiment of a tape laying head adapted to the device of the invention.
Figure 4:
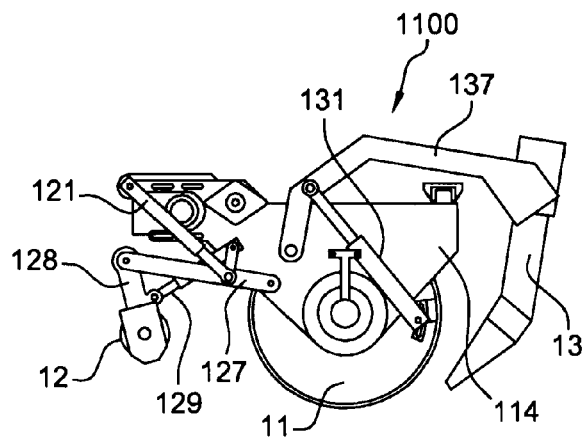
FIG. 4 is a side view of the drape-forming assembly associated with the tape laying head of FIG. 3.

FIGS. 3 and 4: the tape laying head (10) comprises a drum (11) on which the length of fabric to be deposited is wound, a roller (12) able to apply pressure (120) on the length of fabric being deposited so as to compact the preform (110). The assembly (1100) comprising the drum (11), the heating nozzles (13) and the roller (12), called the drape-forming assembly, is connected by means of a sliding connection (210) supported on a frame (200).

Figure 5:
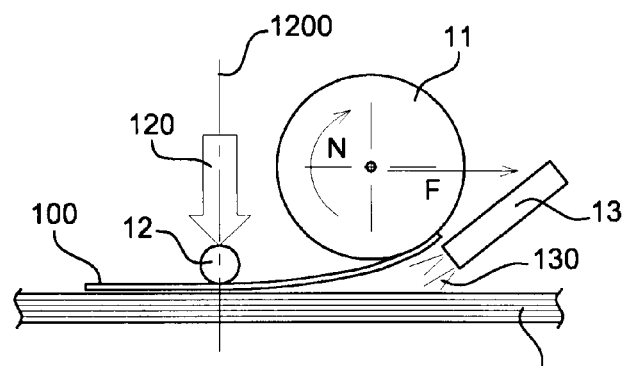
FIG. 5 is a schematic side view of the drape-forming operation for a ply utilizing the device according to the invention.

FIG. 5: during deposition the length of fabric (100) is unreeled onto the preform (110) from the drum (11). To avoid the fibers wrinkling during deposition, they are kept under tension between their output from the drum and their pressing on the preform. To this end, the tape laying head moves at a feed speed (F) while the drum is rotated at a speed N synchronized with the feed speed F so as to keep the length of fabric (100) taut at a substantially constant tension between its output from the drum and its point of pressing by the roller (12). Said roller exercises a compacting action (120) on the length of fabric substantially parallel to the deposition plane (1200) normal to the surface on which this deposition took place.

This pressure is exercised by means of a force-controlled hydraulic or pneumatic cylinder (121), acting on the roller through a system of link rods.

The heating nozzles (13) release a flow of hot air (130) under the length of fabric (100), ahead of its passage under the roller (12). This flow of hot air also locally heats the preform's surface, thus boosting its compaction and the adhesion of the length of fabric (100). However the heating remains local and of short duration so that it does not produce a complete cross-linking of the resin thus heated in the case of a thermo-setting resin. The dusting resin can be different from the resin subsequently injected in the preform. The heating temperature is adapted to the nature of the dusting resin.

Figure 6:
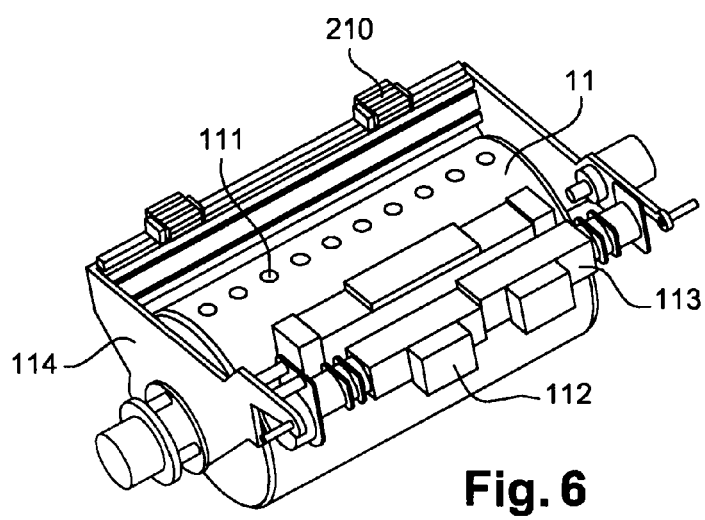
FIG. 6 is a view in perspective and in elevation of an embodiment of the drum adapted to the drape-forming device according to the invention.

FIG. 6: the drum (11) comprises suction orifices (111) at its surface that allow a vacuum to be created between the length of fabric (100) and the drum surface. These suction orifices can be controlled individually or by group in order to adapt the width of the suction area to the width of the length of fabric (100). In particular, the suction orifices can be controlled sequentially for grasping a length of fabric where the cut is not perpendicular to the length, for example in the case of a tapered cut, such that suction is only applied on the length of fabric This length of fabric's fibrous non-impregnated nature means that the vacuum is propagated through the entire thickness wound on the drum. The suction is maintained during the drape-forming phase, which makes it possible to maintain the length of fabric in contact with the drum and control its unwinding speed and its tension.

A sensor placed above the drum allows the position of the end of the length of fabric to be detected.

By combining the information from this sensor with the information about the angular position of the drum, the position of the drape-forming plane (1200) in the machine's space is known at any time as a function of the position of the head. These means allow precise control of the deposition and also allow the end of the length of fabric to be positioned on the preform for the start of drape-forming.

A first motor (112) makes it possible to control the rotation of the drum around its axis with respect to the drum mount (114). Advantageously, this motor is linked in rotation to an angle coder, which allows the angular position of the drum to be known at any time. A second motor (113) allows the drum (11) and its mount (114) to be moved parallel to its axis relative to the support frame (200).

Figure 7:
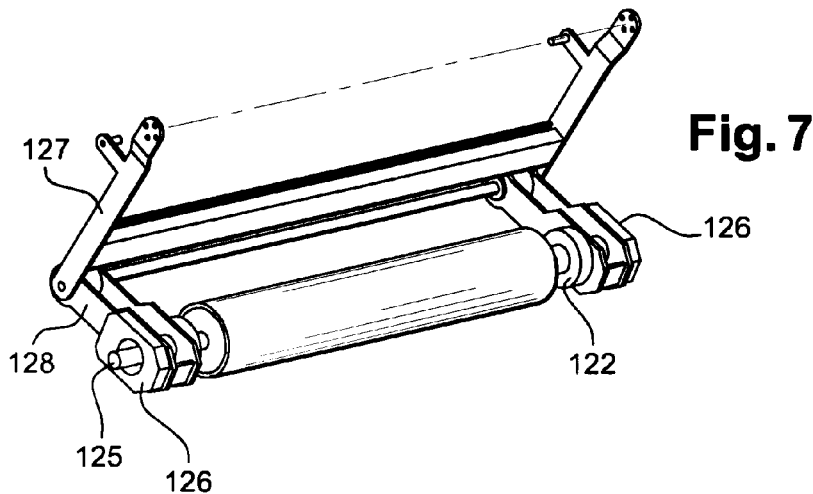
FIG. 7 represents in perspective a view of a roller and its associated devices for changing shape adapted to a tape laying head according to the invention.

FIG. 7: the roller (12) is linked to the drum mount (114) by a series of link rods (127,128). A cylinder (121) is linked to the drum mount (114) and acts on one of the link rods (127). The action of the cylinder (121) makes said link rod (127) pivot, thus bringing the roller into contact with the preform.

The roller (12) is itself linked to the link rods device by pins (125) and ball-joint connections (122) at each of its ends. The roller portion is formed, FIG. 8, of a coil spring (123) covered by an elastic sheath (124). Individually the coils of this spring have a high radial rigidity, which allows them to apply the compacting pressure. In contrast, the spring (123) as a whole has a moderate flexural rigidity; this allows it, under the effect of the compacting pressure (120), to mold itself to the profile of the preform (110) and thus spread the compacting pressure substantially uniformly over the width of the length of fabric (100).

Yokes (126) allow the end of the pins (125) to be moved, by means of two cylinders (129) acting on each of the yokes. Moving the end of the pins, FIG. 8B, makes it possible to confer a curvature to the roller and thus either pre-adapt its curvature to the profile of the preform or to modify the distribution of pressure over the width of the length of fabric by conferring a curvature on the roller that does not complement that of the preform's profile. This effect is useful, especially at the edge of the preform so that only the central portion of the length of fabric is glued.

FIG. 9: the heating device is formed of 3 nozzles (13) for blowing hot air, placed in a mount (137) articulated with respect to the drum mount (114). A cylinder (131), one end of which is fixed to the drum mount (114) and the other to the nozzles mount (137), allows the height of said nozzles to be adjusted. A deflector (135), linked to the nozzles mount (137), isolates the drum (11) from the flow of hot air. Advantageously, a heating power of 5 to 10 kW per blowing nozzle is installed, which allows a very rapid heating of the length of fabric, with a temperature of the blown air equal to or slightly greater than the heating temperature aimed at. Any burning of the length of fabric or the preform is thus avoided. The 3 nozzles can be controlled individually. In this way, it is possible to only heat the center or one side of the length of fabric so that, in combination with the curvature of the roller, the width of adhesion on the preform is limited.

FIG. 10: the tape laying head (10) has a camera (16) for controlling the gap g, FIG. 11, between two lengths of fabric (101,102) deposited edge to edge. To avoid any fiber wrinkling, the two lengths of fabric must not be superimposed. To avoid creating a weakened area in the laminated part, the distance g must be less than 2 mm. The camera (16) detects the position of the adjacent length of fabric already deposited (101). This information is used to slave the motor (113) for moving the drape-forming means (1100) and keep distance g between 0.1 mm and 2 mm.

FIG. 12: contactless distance sensors (17, 17') measure the distance between the axis of the drum and the preform (110). If the distance measured by the first sensor (17) is not the same as the distance measured by the second sensor (17'), the orientation of the drape-forming assembly (1100) is modified along the axis A so as to equalize these two distances. This characteristic allows the drum's axis to be placed parallel to the tangent on the profile of the preform (110).

The distance sensors (17,17') are placed on a retractable frame (170), which also has a laser thru-beam sensor that allows the position of the end of the length of fabric (100) on the drum (11) to be detected.

FIG. 13: the device that is the subject of the invention advantageously comprises a cutting table (50) associated to a magazine for materials (500) comprising spools (501,502, 503) on which continuous bands of material likely to be draped on the preform (110) are wound. These can be materials of different types, e.g. carbon fibers or glass fibers, different formats, e.g. woven and non-woven, or multi-axial stacked according to different stacking sequences, without this being an exhaustive list.

The bands are unreeled onto the cutting plane (510), which can advantageously be equipped with a vacuum device able to keep the band pressed onto said plane. Said band is unreeled so that one of its edges is abutting one of the edges of the cutting table.

To this end, a cylinder acts on the spool to move it parallel to its axis during the unwinding and a laser sensor detects the edge of the band. A closed-loop control between said sensor and the cylinder means that the edge of the band can be made to abut against one of the edges of the cutting table. The band is thus positioned on said table. The band is cut to length, width and end profile by means of an automatic cutting device (520) controlled by a digital control able to interact with the digital control of the drape-forming device. The cutting operations can take place in hidden time during the drape-forming.

The length of fabric (100) having been cut to length and profile and the drape-forming for the previous length of fabric being finished, the tape laying head approaches the cutting table (50) and collects said length of fabric on the drum (11). To this end, the vacuum is relaxed on the cutting table (510) in order to free the length of fabric and the drum (11) captures said length of fabric by means of its suction device (111).

The tape laying head is positioned relative to the cutting table so as to position the length of fabric on the drum in a direction parallel to said drum's axis of rotation. For example so that the centerline of the length of fabric is positioned in the middle of the drum.

The length of fabric is wound on said drum to be laid up on the preform as described previously.

The above description clearly illustrates that through its various features and their advantages the present invention realizes the objectives it set itself. In particular, it allows the automatic drape-forming of different materials on the same preform and in all directions.

The invention claimed is:

1. A device for laying up a length of fabric on a so-called dry laminated fibrous preform on a forming tool, comprising a manipulator able to move and orient in space a tape laying head, said tape laying head comprising:
   a drum comprising at least one suction orifice leading to its surface and able to individually grasp a length of fabric on a mounting outside the tool and the tape laying head;
   means of heating the length of fabric;
   wherein the tape laying head also comprises means able to compact the length of fabric on the preform and tension it before its compaction comprising:
   motorization means able to drive the drum at a controlled speed of rotation around its axis;
   a roller separate from the drum and means to pre-adjust its shape, able to compact the length of fabric deposited on the preform.

2. The device according to claim 1, wherein the means to preadjust the shape of the roller comprise:
   two pins able to guide it in rotation at each of its ends;
   a coil spring linked to the pins and extending between said ends, said spring being substantially parallel to the roller's axis of rotation;
   a device able to move the roller's end pins so as to confer a curvature to the coil spring.

3. The device according to claim 1, wherein the means of heating comprises a nozzle for blowing hot air, the jet of which is directed between the drum and the preform, and a deflector able to isolate the drum from this jet of hot air.

4. The device according to claim 1, wherein the tape laying head comprises means for measuring the orientation of the drum's axis relative to a drape-forming surface on the preform, said measuring means being secured to the axis of the drum.

5. The device according to claim 1, wherein the tape laying head comprises:
   means secured to the drum's axis able to detect the position of the edge of an adjacent length of fabric deposited prior to the length of fabric currently being deposited; and
   motorized means for the relative movement of the drum with respect to the tape laying head parallel to the axis of said drum.

6. A method for laying up a length of fabric on a so-called dry preform on a forming tool using a device comprising a manipulator able to move and orient in space a tape laying head, said tape laying head comprising: a drum including at least one suction orifice leading to its surface and able to individually grasp a length of fabric on a mounting outside the tool and the tape laying head; means of heating the length of fabric; means able to compact the length of fabric on the preform and tension it before its compaction comprising: motorizing means able to drive the drum at a controlled speed of rotation around its axis; a roller separate from the drum and means to preadjust its shape, able to compact the length of fabric deposited on the preform, the method comprising:
   using the device to press the length of fabric on the preform with the help of the roller, the drum being moved by the manipulator at a feed speed (F), and the length of fabric being unwound from the drum driven at a rotation speed (N) synchronized with the feed speed (F) so as to keep the length of fabric at a substantially constant tension between its output from the drum and its pressing by the roller.

7. The method according to claim 6, wherein the length of fabric is pressed onto the drum by suction during its unreeling so as to control its unwinding speed and its tension.

8. The method according to claim 6, wherein the shape of the roller is adapted to obtain a defined pressure profile for the length of fabric on the preform.

9. The method according to claim 8, wherein the shape given to the roller does not complement the shape of the preform on which the length of fabric is deposited.

* * * * *